United States Patent
Liu et al.

(10) Patent No.: US 12,500,789 B2
(45) Date of Patent: Dec. 16, 2025

(54) MULTICAST GROUP MEMBERSHIP CONTROL FOR A CONTAINER ENVIRONMENT

(71) Applicant: VMware, Inc., Palo Alto, CA (US)

(72) Inventors: Bin Liu, Beijing (CN); Wenying Dong, Beijing (CN); Ruochen Shen, Beijing (CN); Quan Tian, Beijing (CN); Jianjun Shen, Redwood City, CA (US)

(73) Assignee: VMware, Inc., Palo Alto, CA (US)

( * ) Notice: Subject to any disclaimer, the term of this patent is extended or adjusted under 35 U.S.C. 154(b) by 362 days.

(21) Appl. No.: 18/126,325

(22) Filed: Mar. 24, 2023

(65) Prior Publication Data
US 2024/0243942 A1 Jul. 18, 2024

(30) Foreign Application Priority Data

Jan. 17, 2023 (WO) ............... PCT/CN2023/000011

(51) Int. Cl.
*H04L 12/28* (2006.01)
*H04L 12/18* (2006.01)
*H04L 45/16* (2022.01)

(52) U.S. Cl.
CPC ............ *H04L 12/185* (2013.01); *H04L 45/16* (2013.01)

(58) Field of Classification Search
CPC ............................ H04L 12/185; H04L 45/16
USPC ........................................................ 370/390
See application file for complete search history.

(56) References Cited

U.S. PATENT DOCUMENTS

| | | | |
|---|---|---|---|
| 8,090,805 B1 * | 1/2012 | Chawla | H04L 45/16 709/240 |
| 2015/0131659 A1 * | 5/2015 | Wijnands | H04L 45/16 370/392 |
| 2016/0285641 A1 * | 9/2016 | He | H04L 12/185 |
| 2016/0285932 A1 * | 9/2016 | Thyamagundalu | H04L 12/4633 |
| 2019/0379594 A1 * | 12/2019 | Johnsen | H04L 45/021 |
| 2021/0274323 A1 * | 9/2021 | Xu | H04W 4/08 |
| 2022/0131786 A1 * | 4/2022 | Nandy | H04L 45/64 |
| 2022/0210059 A1 * | 6/2022 | Brar | H04L 63/101 |

* cited by examiner

*Primary Examiner* — Chuong T Ho
(74) *Attorney, Agent, or Firm* — King Intellectual Asset Management (57) ABSTRACT

The disclosure provides approaches for managing multicast group membership at a node. An approach includes policing whether a pod can join a multicast group based on one or more rules. The approach further includes updating forwarding tables of a virtual switch based on whether the pod is allowed to join the multicast group.

20 Claims, 4 Drawing Sheets

FIG. 5

MULTICAST GROUP MEMBERSHIP CONTROL FOR A CONTAINER ENVIRONMENT

CROSS-REFERENCE TO RELATED APPLICATIONS

This Application claims priority to International Application No. PCT/CN2023/000011, filed Jan. 17, 2023, the entire contents of which are hereby incorporated by reference.

BACKGROUND

Software defined networking (SDN) involves a plurality of hosts in communication over a physical network infrastructure of a data center (e.g., an on-premise data center or a cloud data center). The physical network to which the plurality of physical hosts are connected may be referred to as an underlay network. Each host has one or more virtualized endpoints such as virtual machines (VMs), containers, Docker containers, data compute nodes, isolated user space instances, namespace containers, and/or other virtual computing instances (VCIs), which are connected to, and may communicate over, logical overlay networks. For example, the VMs and/or containers running on the hosts may communicate with each other using an overlay network established by hosts using a tunneling protocol.

A container is a virtualized computing instance that relies on virtual isolation to deploy and run applications that access a shared operating system (OS) kernel. Each container may, for example, package and isolate an application. Groups of containers may be deployed on a single VM or a physical machine. Such a group of containers may be referred to as a pod. More specifically, a pod is a group of one or more containers, with shared storage and network resources, and a specification for how to run the containers. The single VM or physical machine running a pod may be referred to as a node running the pod. More specifically, a node is a single physical machine or VCI, such as a VM, on which one or more pods are deployed. From a network standpoint, containers within a pod share a same network namespace, meaning they share the same internet protocol (IP) address or IP addresses associated with the pod.

As part of an SDN, any arbitrary set of VCIs in a datacenter may be placed in communication across a logical Layer 2 (L2) overlay network by connecting them to a logical switch. A logical switch is an abstraction of a physical switch that is collectively implemented by a set of virtual switches on each node that has a VCI connected to the logical switch. The virtual switch on each host operates as a managed edge switch implemented in software. Virtual switches provide packet forwarding and networking capabilities to VCIs running on the node. In particular, each virtual switch uses hardware based switching techniques to connect and transmit data between VCIs on a same node, or different nodes.

A network plugin, such as a container networking interface (CNI) plugin, may be used to create virtual network interface(s) usable by the pods for communicating on respective logical networks of the SDN infrastructure. In particular, the CNI plugin is a runtime executable that configures a network interface, referred to as a CNI, into a container network namespace. The CNI plugin is further configured to assign a network address (e.g., an IP address) to each created network interface (e.g., for each pod) and may also add routes relevant for the interface. Pods can communicate with each other using their respective IP addresses. For example, packets sent from a source pod to a destination pod may include a source IP address of the source pod and a destination IP address of the destination pod, so that the packets are appropriately routed over the overlay network from the source pod to the destination pod.

Traffic for a particular application, such as a particular container running the application, within a pod may be addressed using a Layer 4 destination port number associated with the application/container. For example, different containers within a pod may listen to specific destination port numbers, such that any particular container within a particular pod can be addressed using the IP address of the particular pod in conjunction with the port number (also referred to as a "port number," "port," or "container port") associated with the particular container. Accordingly, the packets may further include a source port number and a destination port number. The source port number may identify a particular source, such as a particular source container within the pod associated with the source IP address. Further, the destination port number may identify a particular destination, such as a particular destination container within the pod associated with the destination IP address. The port number may be considered a transport layer (e.g., Layer 4) address to differentiate between applications (e.g., containers running applications) or other service endpoints. The port number may refer to a transmission control protocol (TCP) or a user datagram protocol (UDP) port, or the like.

Communication between pods may be accomplished, in part, via use of a virtual switch implemented in the node on which the pod runs. The virtual switch may include one or more virtual ports (Vports) that provide logical connection points for the pods. For example, a CNI of a first pod and a CNI of a second pod running in a node may connect to Vport(s) provided by the virtual switch to allow the first and second pods to communicate with pods connected to the virtual switch on the node, and also to communicate with pods on other nodes using one or more tunneling protocols. In this context "connect to" refers to the capability of conveying network traffic, such as individual network packets, or packet descriptors, pointers, identifiers, etc., between components so as to effectuate a virtual datapath between software components.

Pods may be configured to join a multicast group, such that multicast packets sent to the multicast group are replicated and sent to each pod that is part of the multicast group. Once a pod joins a multicast group, it can receive any traffic sent to the multicast group, which may cause security concerns, such as if a pod joins a multicast group it should not.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Improved techniques for the application of rules to manage multicast traffic to and from pods are described herein. Multicasting is a type of network communication based on routing network traffic among members of multicast groups. A multicast group identifies a set of endpoints (sometimes referred to as "members") that are interested in a particular set of network traffic (sometimes referred to as "multicast network traffic"). An endpoint can be any type of network endpoint, such as a physical machine, a VCI, etc. Multicasting involves routing multicast network traffic from a source endpoint (which may or may not be part of the multicast group) to each member of the multicast group associated with the multicast network traffic. Joining a multicast group is sometimes referred to as subscribing to the multicast group. Multicasting facilitates one-to-many and many-to-many communication while only routing multicast networks traffic to endpoints that indicate, through subscribing, a desire to receive the multicast traffic. In certain aspects, a pod may be an endpoint/member of a multicast group. Further, in certain aspects, other types of endpoints (e.g., other VCIs or physical machines) may be part of a multicast group. Though certain aspects are described with respect to policing multicast traffic for pods in multicast groups, the techniques herein may similarly be applied to policing multicast traffic for other types of endpoints coupled to virtual switches.

Each multicast group is associated with a multicast address, which may be an IP address associated with the multicast group. Accordingly, a source endpoint can send a packet to a multicast group by including the multicast address of the multicast group as the destination IP address in a header of the packet (e.g., and the IP address of the source endpoint as the source IP address in a header of the packet). The packet, based on the addressing of the header, is routed between the source endpoint and each recipient member of the multicast group. For example, routers (e.g., physical and/or virtual routers) between the source endpoint and the recipients duplicate and forward multiple copies of the packet wherever the path to the recipients diverges.

As discussed, each pod is connected (also referred to as coupled) to a virtual switch. Therefore, whenever a multicast packet is sent to or from a pod, the multicast packet is communicated through the virtual switch to which the pod is connected. Accordingly, in certain aspects, a virtual switch, with one or more pods coupled to the virtual switch, is configured to maintain a multicast forwarding table for the one or more pods coupled to the virtual switch. In certain aspects, when a pod coupled to the virtual switch subscribes to a multicast group, the virtual switch associates the pod with the multicast group address of the multicast group in the multicast forwarding table. In certain aspects, when a multicast packet with a multicast address associated with a multicast group arrives at the virtual switch, the virtual switch sends the packet to each pod, coupled to the virtual switch that is associated with the multicast address of the multicast group in the multicast forwarding table. Additionally, the multicast forwarding table may embody rules that permit or forbid multicast packet being forwarded to certain pods and/or permit or forbid multicast packets being forwarded from certain pods. The multicast forwarding table may, for example, (i) associate a multicast address with pods that are members of the corresponding multicast group, (ii) identify source IP addresses for which multicast traffic is dropped without forwarding, and (iii) identify pods for which multicast packets that have a certain multicast group address are dropped without forwarding, etc. As an example, a source endpoint may be a pod that includes containers operating applications that provide multimedia content. The multimedia content may be transmitted as a series of multicast packets address to a particular multicast group comprising destination endpoints as members. The destination endpoints may be pods that include containers operating applications that present that multimedia content to end users. By subscribing to the multicast group, the destination endpoints receive the multimedia content.

To subscribe to a multicast group, a pod sends a subscription request (sometimes referred to as a "multicast join message" or a "registration request") to one or more local multicast routers, such as a first-hop router of the pod. The subscription request is sent via the virtual switch to which the pod is coupled. The first-hop router of the pod may send the join message to other routers in the network, such that the routers are programmed to forward multicast traffic for the multicast group to the pod, as is understood in the art.

When a pod subscribes to a particular multicast group, the pod is able to receive multicast traffic addressed to that multicast group. However, it may not be desirable to allow any pod to join any multicast group or allow all multicast traffic addressed to a multicast group to be forwarded to all pods subscribed to the multicast group. For example, some data transmitted to pods in a multicast group may not be suitable for all pods to receive. One such example includes a multicast group associated with an Internet Protocol television (IPTV) channel, where a source endpoint multicasts the multimedia content of the IPTV channel to the multicast group. In such an example, it may not be desirable to allow any pod to join and receive the multimedia content. Additionally, it may desirable to block specific endpoints from sending or receiving multicast traffic to a specific multicast group. As such, there is a need to enforce rules to police multicast traffic within a virtualized environment.

In certain aspects, an agent controller may maintain multicast rules that police membership of pods in multicast groups and/or control multicast traffic to and/or from of pods. The multicast rules may be created, for example, by a system administrator via the agent controller. The multicast rules may specify one or more multicast rules, such as which pods are permitted or denied to join which multicast groups or may define a set of characteristics that, if a pod has, would prevent that pod from joining a certain multicast group or allow that pod to join a certain multicast group. For example, the multicast rules may include egress rules, ingress rules, registration rules, and/or control rules.

Egress rules control multicast traffic originating from pods. The egress rules may indicate that one or more pods are: not allowed to send traffic to one or more specific multicast groups; not allowed to send traffic to any multicast groups; and/or allowed to send multicast traffic to only one or more specific multicast groups. For example, the egress rules may apply when a packet is sent from a pod with a destination IP address that is a multicast address. An egress rule may, for example, specify (i) a particular pod, (ii) a particular multicast group, (iii) Layer 4 protocols that may or may not be used to send multicast packets, and/or (iv) Layer 4 ports that may or may not be used to send multicast packets.

Ingress rules control multicast traffic that may be sent to a pod. The ingress rules may indicate that one or more pods are: not allowed to receive traffic sent to one or more specific multicast groups that is sent from one or more specific endpoints, IP addresses, or IP address blocks; not allowed to receive traffic from any multicast group that is sent from one or more specific endpoints, IP addresses, or IP address blocks; and/or only allowed to receive traffic from multicast groups where the traffic is sent from one or more specific endpoints, IP addresses, or IP address blocks. For example, the ingress rules may apply when a multicast packet is received at a virtual switch with a destination IP address that is a multicast address. An ingress rule may, for example, specify (i) disallowed sources, such as one or more pods, one or more IP address sources, and/or all sources, (ii) a particular multicast group, (iii) one or more destination pods, (iii) Layer 4 protocols that may or may not be used may or may not be used to receive multicast packets, and/or (iv) Layer 4 ports that may or may not be used to receive multicast packets.

Registration rules set forth whether a pod is allowed to join a multicast group. For example, the registration rules may indicate that one or more pods are: not allowed to join one or more specific multicast groups (meaning they are allowed to join other multicast groups), not allowed to join any multicast group, and/or only allowed to join one or more specific multicast groups. The registrations rules may be applied when a pod sends a multicast join message. A registration rule may specify, for example, (i) which pods are and/or are not allowed to join multicast groups, (ii) which specific pods are not allowed to join specific multicast groups, or (iii) which specific pods are allowed to joint specific multicast groups.

Control rules control whether a pod is or is not allowed to receive multicast query packets. The agent uses multicast query packets to, from time-to-time, determine whether a pod should continue to be a member of a multicast group. When the agent receives a response from a pod, the agent maintains that pod's membership in multicast groups. A control rule may specify, for example, whether a specific pod is allowed or not allowed to receive a multicast query packet.

The agent controller disseminates the multicast rules to agents operating on nodes on which the virtual switches operate. The agent on each node stores the multicast rules received from the agent controller, maintains a master multicast membership table that tracks which pods on the node are subscribed to which multicast groups (e.g., using the multicast rules) based on multicast join requests and the registration rules, and compiles a multicast forwarding table that implements forwarding decisions (e.g., forward or drop multicast packets) based on the master membership table, the egress rules, the ingress rules, and the control rules.

When a virtual switch on a node receives a multicast join request from one of the pods connected to the virtual switch, it forwards the multicast join request to the agent on the same node. For example, a pod may send a multicast join request to register for a particular multicast group (e.g., an Internet Group Management Protocol (IGMP) join message in Internet protocol version 4 (IPv4), Multicast Listener Discovery (MLD) in Internet protocol version 6 (IPv6), etc.). The agent determines whether to allow that pod to join the specified multicast group based on the multicast rules, such as one or more of the registration rules. If the pod is permitted to join the multicast group, the agent updates the master multicast membership table to include the pod as associated with the multicast group and pushes an update of the multicast forwarding table to the virtual switch. In such a scenario, the pod that attempted to register with a particular multicast group would receive multicast packets which are destined the multicast group. If the pod is not permitted to join the multicast group, the agent either does not update the master multicast membership table to include the pod as associated with the multicast group, or removes any association in the master multicast membership table of the pod with the multicast group. In such a scenario, the pod that attempted to register with a particular multicast group would not receive any multicast packets which are destined the multicast group because a rule exists to disallow the pod from receiving multicast packets from the multicast group. When the membership table is updated and/or when new multicast rules are received, the agent recompiles the multicast forwarding table and pushes the update to the virtual switch.

From time-to-time, the agent may verify that the group memberships on the master multicast membership table align with the multicast rules. For example, when the agent receives an update to the multicast rules from the agent controller, the agent may reapply the rules to the master multicast membership table. In such an example, if the master multicast membership table changes, the agent recompiles and pushes the multicast forwarding table to the virtual switch such that the virtual switch overwrites any previously stored multicast forwarding table.

When a virtual switch receives a multicast packet with multicast address of a multicast group as the destination IP address, it determines one or more pods (if any) coupled to the virtual switch that are members of the multicast group (e.g., are associated with the multicast address in the multicast forwarding table). If there are no members, then the virtual switch drops the multicast packet. Further, the virtual switch determines whether any of the pods that are members of the multicast group are restricted from receiving the multicast packet, based on, for example, the source IP address of the multicast packet. For example, the virtual switch may determine whether the source IP address in the multicast packet is associated with an ingress rule as reflected on the multicast forwarding table. The virtual switch then selectively forwards or drops the multicast packet to the pods based on the multicast forwarding table. For example, if the multicast forwarding table sets forth that no receivers in the multicast group are to receive multicast packets from the source IP address, the virtual switch drops the packet without sending it to any pods. As another example, if the multicast forwarding table sets forth that certain pods in the multicast group are not to receive multicast packets from the source IP address, the virtual switch only forwards the packet to any pods allowed to receive the packet. As another example, if the multicast forwarding table does not specify a forwarding rule for the source IP address, the virtual switch forwards the multicast packet to the subscribed pods. Though certain aspects are discussed with respect to a VM as a node running pods, these are just examples, and the techniques discussed herein are also applicable to physical machines as nodes running pods.

Figure 1:
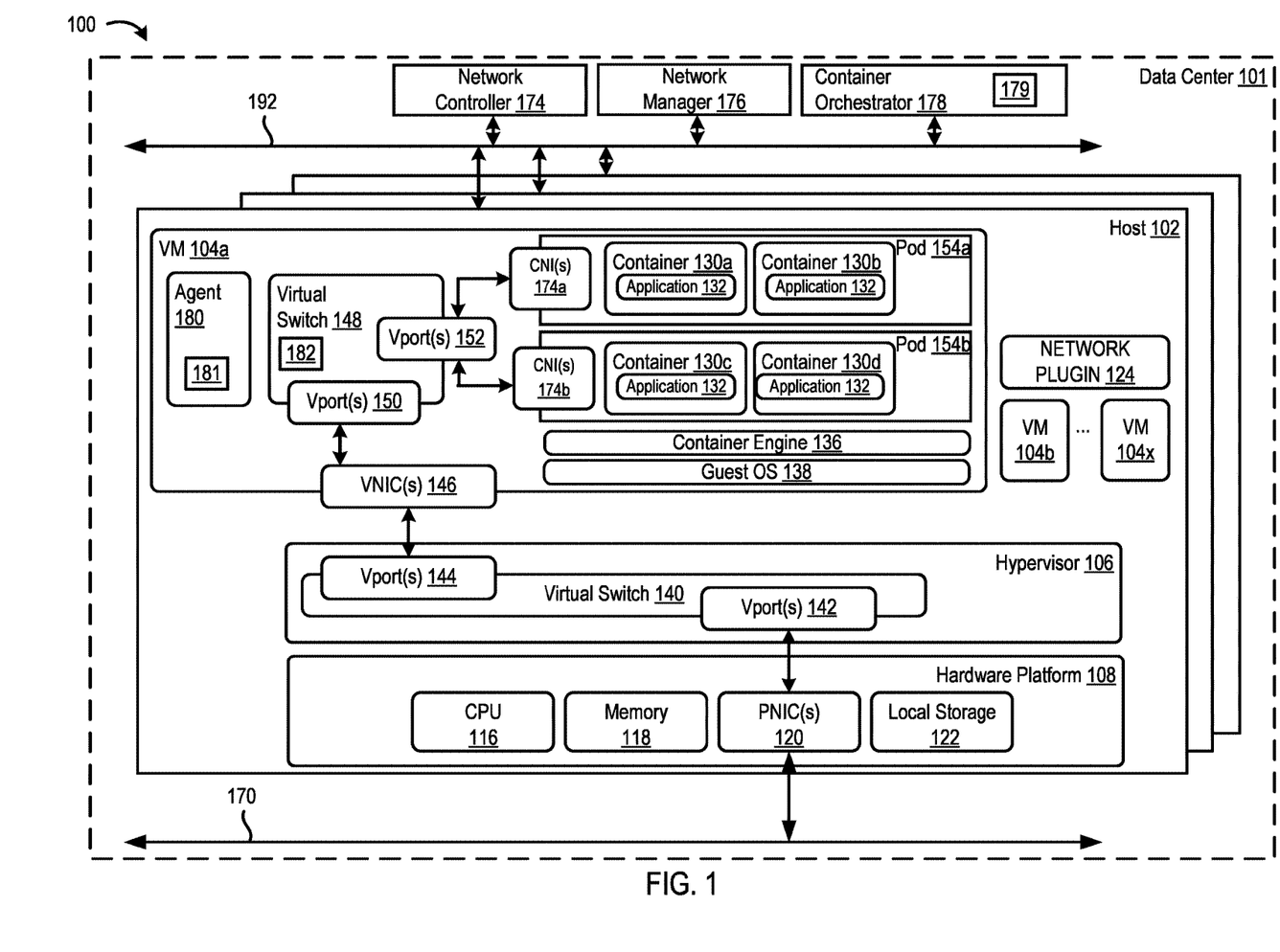
FIG. 1 illustrates a computing system in which embodiments described herein may be implemented.

FIG. 1 depicts example physical and virtual network components in a networking environment 100 in which embodiments of the present disclosure may be implemented.

Networking environment 100 includes a data center 101. Data center 101 includes one or more hosts 102, a management network 192, a data network 170, a network controller 174, a network manager 176, and a container orchestrator 178. Data network 170 and management network 192 may be implemented as separate physical networks or as separate virtual local area networks (VLANs) on the same physical network.

Host(s) 102 may be communicatively connected to data network 170 and management network 192. Data network 170 and management network 192 are also referred to as physical or "underlay" networks, and may be separate physical networks or the same physical network as discussed. As used herein, the term "underlay" may be synonymous with "physical" and refers to physical components of networking environment 100. As used herein, the term "overlay" may be used synonymously with "logical" and refers to the logical network implemented at least partially within networking environment 100.

Host(s) 102 may be geographically co-located servers on the same rack or on different racks in any arbitrary location in the data center. Host(s) 102 may be configured to provide a virtualization layer, also referred to as a hypervisor 106, that abstracts processor, memory, storage, and networking resources of a hardware platform 108 into multiple VMs 104a-104x (collectively referred to herein as "VMs 104" and individually referred to herein as "VM 104").

Host(s) 102 may be constructed on a server grade hardware platform 108, such as an x86 architecture platform. Hardware platform 108 of a host 102 may include components of a computing device such as one or more processors (CPUs) 116, system memory 118, one or more network interfaces (e.g., physical network interface cards (PNICs) 120), storage 122, and other components (not shown). A CPU 116 is configured to execute instructions, for example, executable instructions that perform one or more operations described herein and that may be stored in the memory and storage system. The network interface(s) enable host 102 to communicate with other devices via a physical network, such as management network 192 and data network 170.

Hypervisor 106 includes a virtual switch 140. A virtual switch 140 may be a virtual switch attached to a default port group defined by network manager 176 and provide network connectivity to a host 102 and VMs 104 on the host. Port groups include subsets of Vports of a virtual switch, each port group having a set of logical rules according to a policy configured for the port group. Each port group may comprise a set of Vports associated with one or more virtual switches on one or more hosts. Vports associated with a port group may be attached to a common VLAN according to the IEEE 802.1Q specification to isolate the broadcast domain.

A virtual switch 140 may be a virtual distributed switch (VDS). In this case, each host 102 may implement a separate virtual switch corresponding to the VDS, but the virtual switches 140 at each host 102 may be managed like a single virtual distributed switch (not shown) across the hosts 102.

Each of VMs 104 running on host 102 may include virtual interfaces, often referred to as virtual network interface cards (VNICs), such as VNICs 146, which are responsible for exchanging packets between VMs 104 and hypervisor 106. VNICs 146 can connect to Vports 144, provided by virtual switch 140. Virtual switch 140 also has Vport(s) 142 connected to PNIC(s) 120, such as to allow VMs 104 to communicate with virtual or physical computing devices outside of host 102 via data network 170 and/or management network 192.

Each VM 104 may also implement a virtual switch 148 for forwarding ingress packets to various entities running within the VM 104. For example, the various entities running in within each VM 104 may include pods 154a and 154b (collectively "pods 154") that include containers 130a-130d (collectively "containers 130").

In particular, each VM 104 implements a virtual hardware platform that supports the installation of a guest OS 138 which is capable of executing one or more applications. Guest OS 138 may be a standard, commodity operating system. Examples of a guest OS include Microsoft Windows, Linux, and/or the like.

Each VM 104 may include a container engine 136 installed therein and running as a guest application under control of guest OS 138. Container engine 136 is a process that enables the deployment and management of virtual instances (referred to interchangeably herein as "containers") by providing a layer of OS-level virtualization on guest OS 138 within VM 104. Containers 130 are software instances that enable virtualization at the OS level. That is, with containerization, the kernel of guest OS 138, or an OS of host 102 if the containers are directly deployed on the OS of host 102, is configured to provide multiple isolated user space instances, referred to as containers. Containers 130 appear as unique servers from the standpoint of an end user that communicates with each of containers 130. However, from the standpoint of the OS on which the containers execute, the containers are user processes that are scheduled and dispatched by the OS.

Containers 130 encapsulate an application, such as application 132 as a single executable package of software that bundles application code together with all of the related configuration files, libraries, and dependencies required for it to run. Application 132 may be any software program, such as a word processing program or a gaming server.

A user can deploy containers 130 through container orchestrator 178. Container orchestrator 178 implements an orchestration control plane, such as Kubernetes®, to deploy and manage applications and/or services thereof on hosts 102, of a host cluster, using containers 130. For example, Kubernetes may deploy containerized applications as containers 130 and a control plane (not shown) on a cluster of hosts. The control plane, for each cluster of hosts, manages the computation, storage, and memory resources to run containers 130. Further, the control plane may support the deployment and management of applications (or services) on the cluster using containers 130. In some cases, the control plane deploys applications as pods 154 of containers 130 running on hosts 102, either within VMs or directly on an OS of the host. Other type of container-based clusters based on container technology, such as Docker® clusters, may also be considered.

In order for packets to be forwarded to and received by pods 154 and their containers 130 running in a first VM 104a, each of the pods 154 may be set-up with a network interface, such as a CNI 174a/174b (collectively "CNIs 174"). Each of the CNIs 174 is associated with an IP address, such that the corresponding pod 154, and each container 130 within the pod 154, is addressable by the IP address. Accordingly, after each pod 154 is created, a network plugin 124 is configured to set up networking for the newly created pod 154 enabling the new containers 130 of the pod 154 to send and receive traffic.

Further, network plugin 124 may also configure virtual switch 148 running in VM(s) 104 (e.g., where the created pods 154 are running) to forward traffic destined for the new pods 154. This allows virtual switch 148 to forward traffic for the new pods 154. Accordingly, for example, after receiving the traffic from VNIC 146 directed for a pod 154a, virtual switch 148 processes the packets and forwards them (e.g., based on the pod's IP address in the packets' header)

to pod 154*a* by pushing the packets out from a Vport 152 on virtual switch 148 connected to CNI 174*a* that is configured for and attached to a pod 154*a*. As shown, other CNIs, such as CNI 174*b*, may be configured for and attached to different, existing pod 154*b*.

Data center 101 includes a network management plane and a network control plane. The management plane and control plane each may be implemented as single entities (e.g., applications running on a physical or virtual compute instance), or as distributed or clustered applications or components. In alternative aspects, a combined manager/controller application, server cluster, or distributed application, may implement both management and control functions. In the embodiment shown, network manager 176 at least in part implements the network management plane and network controller 174 at least in part implements the network control plane.

The network control plane is a component of software defined network (SDN) infrastructure and determines the logical overlay network topology and maintains information about network entities such as logical switches, logical routers, endpoints, etc. The logical topology information is translated by the control plane into physical network configuration data that is then communicated to network elements of host(s) 102. Network controller 174 generally represents a network control plane that implements software defined networks, e.g., logical overlay networks, within data center 101. Network controller 174 may be one of multiple network controllers executing on various hosts in the data center that together implement the functions of the network control plane in a distributed manner. Network controller 174 may be a computer program that resides and executes in a server in the data center 101, external to data center 101 (e.g., such as in a public cloud) or, alternatively, network controller 174 may run as a virtual appliance (e.g., a VM) in one of hosts 102. Network controller 174 collects and distributes information about the network from and to endpoints in the network. Network controller 174 may communicate with hosts 102 via management network 192, such as through control plane protocols. In certain aspects, network controller 174 implements a central control plane (CCP) which interacts and cooperates with local control plane components, e.g., agents, running on hosts 102 in conjunction with hypervisors 106.

Network manager 176 is a computer program that executes in a server in networking environment 100, or alternatively, network manager 176 may run in a VM 104, e.g., in one of hosts 102. Network manager 176 communicates with host(s) 102 via management network 192. Network manager 176 may receive network configuration input from a user, such as an administrator, or an automated orchestration platform (not shown) and generate desired state data that specifies logical overlay network configurations. For example, a logical network configuration may define connections between VCIs and logical ports of logical switches. Network manager 176 is configured to receive inputs from an administrator or other entity, e.g., via a web interface or application programming interface (API), and carry out administrative tasks for data center 101, including centralized network management and providing an aggregated system view for a user.

In the illustrated example, the container orchestrator 178 includes an agent controller 179 that is communicatively coupled to agents 180 operating on the VMs 104. Though shown in container orchestrator 178, agent controller 179 may be separate from container orchestrator 178 on management network 192. The agent controller 179 monitors resources used by the pods 154 and provides an API to provide information relating to resource usage. In the illustrated example, the agent controller 179 maintains multicast rules to control membership of pods 154 in multicast groups and/or control egress and ingress of multicast packets to/from the pods 154. When a multicast rule is updated (e.g., created, modified, or deleted) through the API, the agent controller 179 may push to, or otherwise cause the multicast rules to be retrieved by, the agents 180. These multicast rules may include egress rules, ingress rules, registration rules, and/or control rules.

The agents 180 operate on the VMs 104 and are communicatively coupled to the virtual switch 148 operating on the same VM 104. The agents 180 are responsible for managing multicast traffics to and from pods 154 operating on the same VM 104. The agents 180 store a copy of the multicast rules received from the agent controller 179. The agent 180 also maintains a master multicast membership table 181. The master multicast membership table 181 specifies which pods 154 operating on the VM 104 are members of which multicast groups based on an application of the registration rules to the pods 154. For example, the agent 180 may receive a multicast join request that was sent from one of the pods 154 to the virtual switch 148 and forwarded to the agent 180. In such an example, the agent 180 applies the registration rules to the request to determine if the pod 154 is allowed to join the multicast group. If the pod 154 is allowed to join, the agent 180 updates the master multicast membership table 181 to associate the requesting pod 154 with the specified multicast group. Subsequently, the master multicast membership table 181, along with egress rules, ingress rules, and/or control rules may be compiled into a multicast forwarding table and pushed to the virtual switch 148 to store as its multicast forwarding table 182. In some examples, from time-to-time, the agent 180 may reanalyze the master multicast membership table 181 according to the multicast rules. For example, when the agent 180 receives an updated list of multicast rules from the agent controller 179, the agent 180 may reanalyze the master multicast membership table 181 to remove any pod 154 from a multicast group that is no longer allowed according to any updated or new registration rule.

Figure 2:
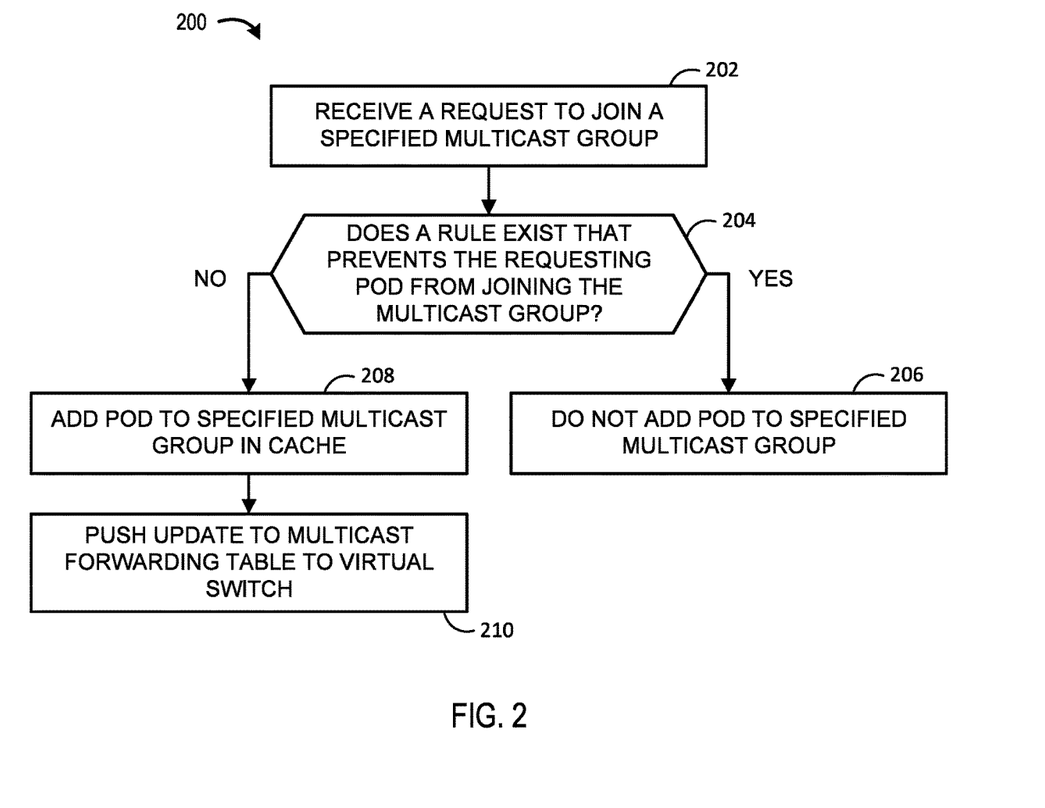
FIG. 2 is a flowchart of an example method to control membership of pods in multicast groups, according to embodiments of the present disclosure.

An example method to control membership of pods in multicast groups is illustrated in FIG. 2.

Operations 200 begin at step 202 with receiving, by an agent (e.g., the agent 180 of FIG. 1), a multicast join request sent by one of the pods 154 operating on the VM 104. The multicast join request specifies a particular multicast group, such as by a multicast address of the multicast group. The multicast join request may be forward by a virtual switch (e.g., the virtual switch 148) communicatively coupled to the requesting pod 154.

Operations 200 continue at step 204 with determining, by the agent, whether a registration rules exists that prevents the requesting pod 154 from joining the multicast group.

When there is a registration rule that prevents the requesting pod 154 from joining the multicast group, operations 200 continue at step 206 with the agent not adding the requesting pod to the multicast group on the master multicast membership table 181.

When there is no registration rule that prevents the requesting pod 154 from joining the multicast group, operations 200 continue at step 208 with adding, by the agent, the requesting pod to the multicast group in a master multicast membership table (e.g., the master multicast membership table 181 of FIG. 1).

Operations 200 then continue to step 210 with compiling and pushing, by the agent, the multicast forwarding table to the virtual switch to reflect the update to the master membership table.

Returning to FIG. 1, the virtual switches 148 manage multicast traffic to and from the pods 154 connected to the virtual switch 148. The multicast forwarding table 182 also reflects ingress rules and egress rules received by agent 180. The virtual switch 148 uses the multicast forwarding table 182 to determine which multicast packets to forward to and from which pods 154 coupled to virtual switch 148, such as discussed with respect to FIGS. 3 and 4.

Figure 3:
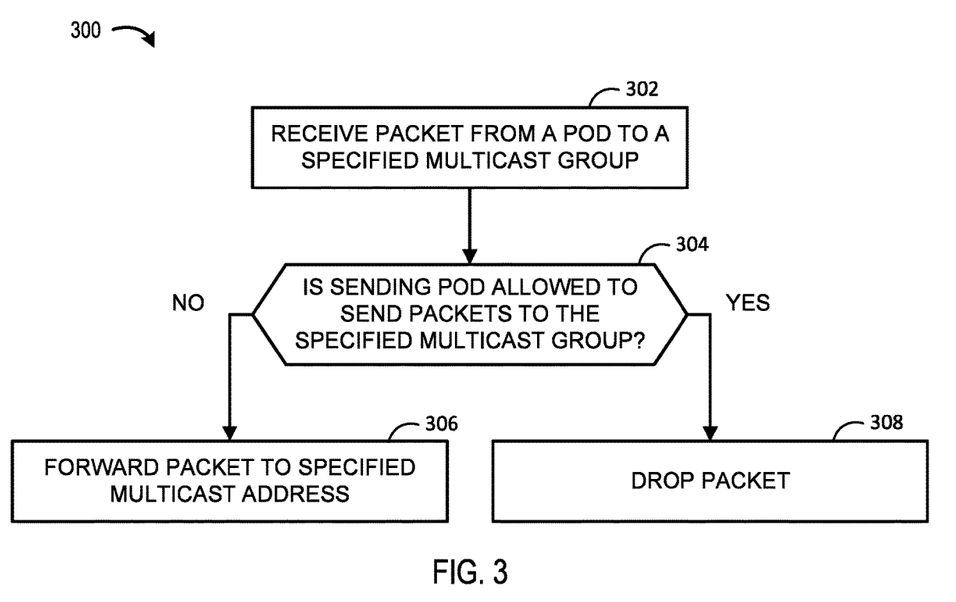
FIG. 3 is a flowchart of an example method to handle egress multicast traffic in a container environment, according to embodiments of the present disclosure.

FIG. 3 illustrates an example method to handle egress multicast traffic at a virtual switch (e.g., the virtual switch 148 of FIG. 1). Operations 300 begin at step 302 with receiving, by the virtual switch, a multicast packet from a pod (e.g., a pod 154 of FIG. 1) to a specified multicast group.

Operations 300 continue at step 304 with determining, by the virtual switch, whether the pod is allowed to send packets to the specified multicast group. For example, the virtual switch determines whether the multicast forwarding table reflects any egress rules that indicate that the sending pod is not allowed to send multicast packets to the multicast address of the multicast group.

When the sending pod is allowed to send packets to the specified multicast group, operations 300 continue to step 306 with forwarding, by the virtual switch, the multicast packet to the specified multicast address. For example, the virtual switch may forward the multicast packet to the next hop (e.g., the virtual switch 140 of FIG. 1) to be forward across the network (e.g., the data network 170 of FIG. 1).

When the sending pod is not allowed to send packets to the specified multicast group, operations 300 continue to step 308 with dropping the packet by the virtual switch.

Figure 4:
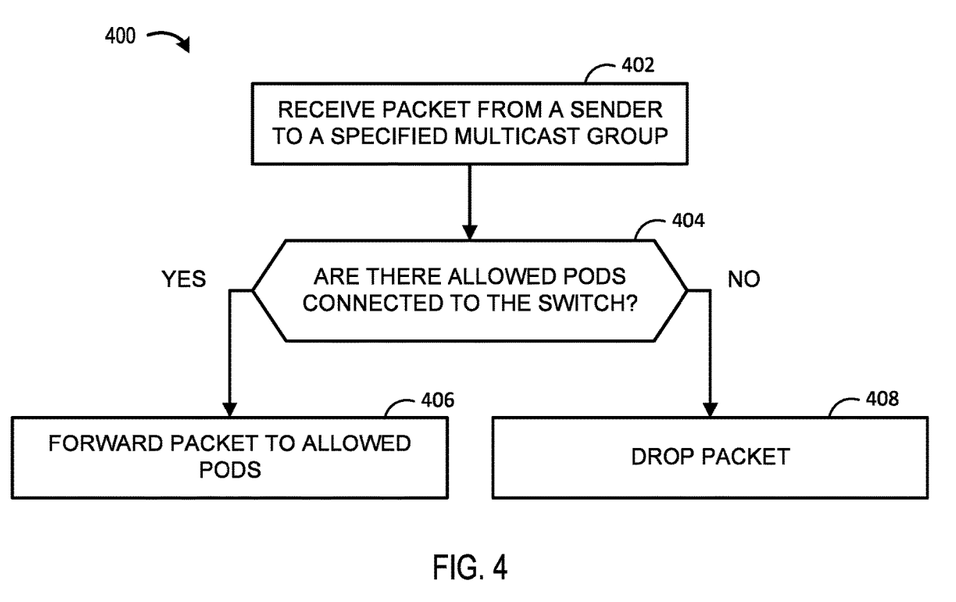
FIG. 4 is a flowchart of an example method to handle ingress multicast traffic in a container environment, according to embodiments of the present disclosure.

FIG. 4 illustrates an example method to handle ingress multicast traffic through a virtual switch (e.g., the virtual switch 148 of FIG. 1). Operations 400 begin at step 402 with receiving a packet from a sender to a specified multicast group.

Operations 400 continue at step 404 with determining, by the virtual switch, whether there are any pods connected to the virtual switch that are allowed to receive the multicast packet from the particular sender. For example, the virtual switch, using the multicast forwarding table (e.g., the multicast forwarding table 182 of FIG. 1), may determine whether there are pods connected to the virtual switch that are members of the specified multicast group and whether any of the member pods connected to the virtual switch are allowed to receive multicast packets from the particular source. For example, the multicast forwarding table may reflect one or more ingress rules that indicate that packets with a source IP address of the sender are not allowed to be received by one or more pods connected to the virtual switch.

When there is at least one pod in the multicast group connected to the virtual switch that is allowed to receive the multicast packet, operations 400 continue to step 406 with forwarding, by the virtual switch, the multicast packet to the allowed pod(s).

When there is no pod in the multicast group connected to the virtual switch that is allowed to receive the multicast packet, operations 400 continue to step 408 with dropping the packet by the virtual switch.

Figure 5:
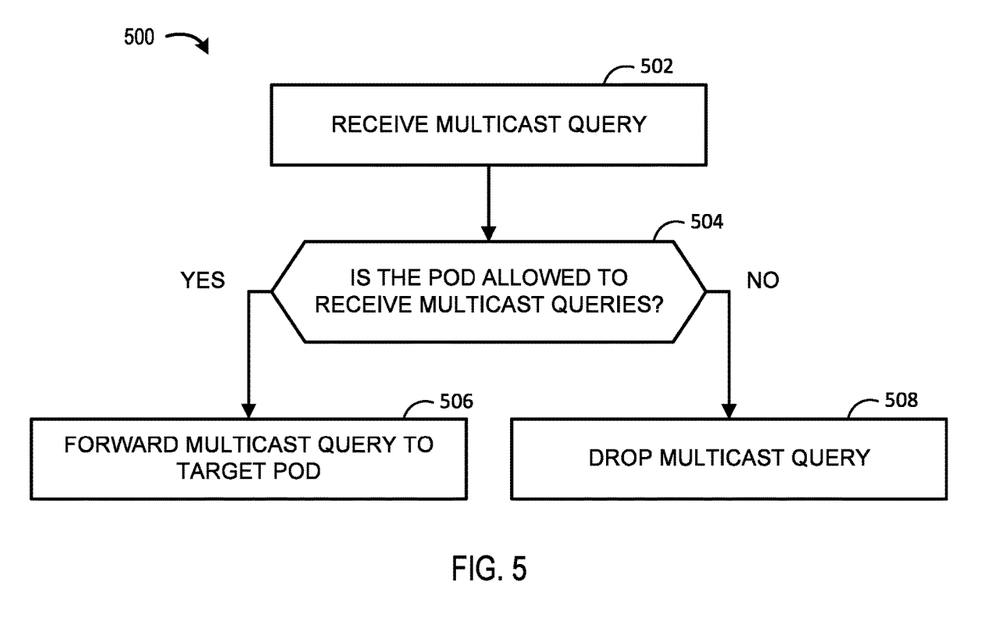
FIG. 5 is a flowchart of an example method to handle an example control rule in a container environment, according to embodiments of the present disclosure.

FIG. 5 illustrates an example method to handle an example control rule through a virtual switch (e.g., the virtual switch 148 of FIG. 1). Operations 500 begin at step 502 with receiving a multicast query. While FIG. 5 describes handling multicast queries, the operations 500 may handle any type of message or packet that is governed by a control rule.

Operations 500 continue at step 504 with determining, by the virtual switch, whether the pod specified by the multicast query is allowed to receive the multicast query. For example, the virtual switch, using the multicast forwarding table (e.g., the multicast forwarding table 182 of FIG. 1), may determine whether the pod is allowed to receive multicast queries. For example, the multicast forwarding table may reflect one or more control rules that indicate that the pod is not allowed to receive multicast queries.

When the pod is allowed to receive the multicast query, operations 500 continue to step 506 with forwarding, by the virtual switch, the multicast packet to the specified pod.

When the pod is not allowed to receive the multicast query, operations 500 continue to step 508 with dropping the multicast query by the virtual switch.

It should be noted that though certain functions are described as performed by separate components, such as an agent and a virtual switch, the functions may be performed by a single component or additional components.

The various embodiments described herein may employ various computer-implemented operations involving data stored in computer systems. For example, these operations may require physical manipulation of physical quantities-usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and/or the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method comprising:
receiving, from a first pod, a multicast join request message to join a first multicast group;
determining, based on one or more multicast rules, whether the first pod is allowed to join the first multicast group;
based on determining the first pod is allowed to join the first multicast group, updating a multicast membership table stored in the node to indicate the first pod is a member of the first multicast group;
updating forwarding rules in a multicast forwarding table of a virtual switch to reflect the updated multicast membership table;
receiving, at the virtual switch, a first multicast packet with a source address and a destination address; and
determining whether to forward the first multicast packet to the first pod based at least in part on:
the multicast forwarding table;
the source address;
the destination address; and
a rule indicating whether packets associated with the first multicast group are to be forwarded based on one or more of the source address or the destination address.

2. The method of claim 1, wherein an agent operating on a virtual machine (VM) receives the multicast join request and determines whether the first pod is allowed to join the first multicast group, the method further comprising:
receiving, by the agent and from an agent controller running on a container orchestrator, the one or more multicast rules.

3. The method of claim 2 further comprising:
compiling, by the agent, the multicast forwarding table based on the multicast membership table and one or more of egress rules, ingress rules, or control rules.

4. The method of claim 1, wherein determining whether to forward the first multicast packet comprises determining to forward the first multicast packet to the first pod based on the first pod being a member of the first multicast group and the destination address of the first multicast packet being associated with the first multicast group.

5. The method of claim 1, further comprising:
receiving, at the virtual switch, a second multicast packet with a destination address corresponding to a second multicast group; and
determining to not forward the second multicast packet to the first pod based on the first pod not being a member of the second multicast group and the destination address of the second multicast packet being associated with the second multicast group.

6. The method of claim 1, wherein determining whether to forward the first multicast packet comprises determining to not forward the first multicast packet based on the first pod being a member of the first multicast group, the destination address of the first multicast packet being associated with the first multicast group, and a rule indicating multicast packets associated with the first multicast group must be sent from an address other than the source address.

7. The method of claim 1, wherein determining whether to forward the first multicast packet comprises determining to not forward the first multicast packet based on the first pod being a member of the first multicast group, the destination address of the first multicast packet being associated with the first multicast group, and a rule indicating multicast packets associated with the first multicast group must be sent from an address other than the source address to be received by the first pod.

8. The method of claim 1 further comprising forwarding the first multicast packet to the first pod based on the determining whether to forward the first multicast packet.

9. A computer system comprising memory and one or more processors configured to perform operations comprising:
   receiving, from a first pod, a multicast join request message to join a first multicast group;
   determining, based on one or more multicast rules, whether the first pod is allowed to join the first multicast group;
   based on determining the first pod is allowed to join the first multicast group, updating a multicast membership table stored in the node to indicate the first pod is a member of the first multicast group;
   updating forwarding rules in a multicast forwarding table of a virtual switch to reflect the updated multicast membership table;
   receiving, at the virtual switch, a first multicast packet with a source address and a destination address; and
   determining whether to forward the first multicast packet to the first pod based at least in part on:
      the multicast forwarding table;
      the source address;
      the destination address; and
      a rule indicating whether packets associated with the first multicast group are to be forwarded based on one or more of the source address or the destination address.

10. The computer system of claim 9, wherein determining whether to forward the first multicast packet comprises determining to forward the first multicast packet to the first pod based on the first pod being a member of the first multicast group and the destination address of the first multicast packet being associated with the first multicast group.

11. The computer system of claim 9, wherein the operations further comprise:
   receiving, at the virtual switch, a second multicast packet with a destination address corresponding to a second multicast group; and
   determining to not forward the second multicast packet to the first pod based on the first pod not being a member of the second multicast group and the destination address of the second multicast packet being associated with the second multicast group.

12. The computer system of claim 9, wherein determining whether to forward the first multicast packet comprises determining to not forward the first multicast packet based on the first pod being a member of the first multicast group, the destination address of the first multicast packet being associated with the first multicast group, and a rule indicating multicast packets associated with the first multicast group must be sent from an address other than the source address.

13. The computer system of claim 9, wherein determining whether to forward the first multicast packet comprises determining to not forward the first multicast packet based on the first pod being a member of the first multicast group, the destination address of the first multicast packet being associated with the first multicast group, and a rule indicating multicast packets associated with the first multicast group must be sent from an address other than the source address to be received by the first pod.

14. The computer system of claim 9, wherein the operations further comprise forwarding the first multicast packet to the first pod based on the determining whether to forward the first multicast packet.

15. A non-transitory computer-readable medium storing instructions, which when executed by a computer system, cause the computer system to perform operations comprising:
   receiving, from a first pod, a multicast join request message to join a first multicast group;
   determining, based on one or more multicast rules, whether the first pod is allowed to join the first multicast group;
   based on determining the first pod is allowed to join the first multicast group, updating a multicast membership table stored in the node to indicate the first pod is a member of the first multicast group;
   updating forwarding rules in a multicast forwarding table of a virtual switch to reflect the updated multicast membership table;
   receiving, at the virtual switch, a first multicast packet with a source address and a destination address; and
   determining whether to forward the first multicast packet to the first pod based at least in part on:
      the multicast forwarding table;
      the source address;
      the destination address; and
      a rule indicating whether packets associated with the first multicast group are to be forwarded based on one or more of the source address or the destination address.

16. The non-transitory computer-readable medium of claim 15, wherein determining whether to forward the first multicast packet comprises determining to forward the first multicast packet to the first pod based on the first pod being a member of the first multicast group and the destination address of the first multicast packet being associated with the first multicast group.

17. The non-transitory computer-readable medium of claim 15, wherein the operations further comprise:
   receiving, at the virtual switch, a second multicast packet with a destination address corresponding to a second multicast group; and
   determining to not forward the second multicast packet to the first pod based on the first pod not being a member of the second multicast group and the destination address of the second multicast packet being associated with the second multicast group.

18. The non-transitory computer-readable medium of claim 15, wherein determining whether to forward the first multicast packet comprises determining to not forward the first multicast packet based on the first pod being a member of the first multicast group, the destination address of the first multicast packet being associated with the first multicast group, and a rule indicating multicast packets associated with the first multicast group must be sent from an address other than the source address.

19. The non-transitory computer-readable medium of claim 15, wherein determining whether to forward the first multicast packet comprises determining to not forward the first multicast packet based on the first pod being a member of the first multicast group, the destination address of the first multicast packet being associated with the first multicast group, and a rule indicating multicast packets associated with the first multicast group must be sent from an address other than the source address to be received by the first pod.

20. The non-transitory computer-readable medium of claim 15, further comprising forwarding the first multicast packet to the first pod based on the determining whether to forward the first multicast packet.

* * * * *